United States Patent
Sato

(10) Patent No.: US 11,616,918 B2
(45) Date of Patent: Mar. 28, 2023

(54) ELEMENT AND IMAGE FORMING DEVICE

(71) Applicant: CANON KABUSHIKI KAISHA, Tokyo (JP)

(72) Inventor: Takahiro Sato, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 16/998,368

(22) Filed: Aug. 20, 2020

(65) Prior Publication Data
US 2021/0058570 A1    Feb. 25, 2021

(30) Foreign Application Priority Data

Aug. 21, 2019  (JP) .............................. JP2019-151259

(51) Int. Cl.
| | |
|---|---|
| G01J 5/10 | (2006.01) |
| H01Q 7/00 | (2006.01) |
| H01Q 1/24 | (2006.01) |
| H04N 5/33 | (2023.01) |
| H01Q 9/16 | (2006.01) |
| H01Q 23/00 | (2006.01) |

(52) U.S. Cl.
CPC ............... H04N 5/332 (2013.01); G01J 5/10 (2013.01); H01Q 1/248 (2013.01); H01Q 7/00 (2013.01); H01Q 9/16 (2013.01); H01Q 23/00 (2013.01)

(58) Field of Classification Search
CPC .. H04N 5/332; G01J 5/10; H01Q 7/00; H01Q 1/248; H01Q 1/38
See application file for complete search history.

(56) References Cited

U.S. PATENT DOCUMENTS

| | | | |
|---|---|---|---|
| 5,343,034 A | 8/1994 | Sato | |
| 5,792,279 A | 8/1998 | Tsuboi et al. | |
| 9,893,423 B2 * | 2/2018 | Debray | .................... H01Q 7/00 |
| 10,897,073 B2 * | 1/2021 | Sato | ......................... H01Q 1/38 |
| 2015/0034825 A1 * | 2/2015 | Debray | .................. H04N 5/332 |
| | | | 250/332 |

(Continued)

FOREIGN PATENT DOCUMENTS

| | | | |
|---|---|---|---|
| JP | 2013-214939 A | 10/2013 | |
| JP | 2020036311 A * | 3/2020 | ............... H01Q 1/22 |

OTHER PUBLICATIONS

Kotter et al., Theory and Manufacturing Processes of Solar Nanoantenna Electromagnetic Collectors, Feb. 2010, Journal of Solar Energy Engineering, vol. 132, Iss. 1, pp. 1-9 (Year: 2010).*

*Primary Examiner* — David P Porta
*Assistant Examiner* — Jeremy S Valentiner
(74) *Attorney, Agent, or Firm* — Venable LLP

(57) ABSTRACT

An element includes a loop antenna configured to include first and second metal lines on a surface of a substrate on or from which terahertz waves are incident or emitted, and a rectifying element or an oscillation element electrically connected to the first and second metal lines. The element has a facing section at which a first surface of a first end not connected to the rectifying element or the oscillation element at an end of the first metal line faces a second surface of a second end not connected to the rectifying element or the oscillation element at an end of the second metal line, a direction in which the first surface faces the second surface is a direction in which the first end extends and is a direction intersecting a direction in which the second end extends.

17 Claims, 12 Drawing Sheets

(56) References Cited

U.S. PATENT DOCUMENTS

| | | | |
|---|---|---|---|
| 2016/0169739 A1* | 6/2016 | Debray | H01Q 9/04 250/338.4 |
| 2020/0067170 A1 | 2/2020 | Sato et al. | |
| 2020/0293806 A1 | 9/2020 | Sato et al. | |
| 2020/0296265 A1 | 9/2020 | Itsuji et al. | |
| 2020/0296266 A1 | 9/2020 | Koyama et al. | |

* cited by examiner

ELEMENT AND IMAGE FORMING DEVICE

BACKGROUND OF THE INVENTION

Field of the Invention

The present invention relates to an element and an image forming device.

Description of the Related Art

In a terahertz wave sensor receiving terahertz waves which are radio waves (electromagnetic waves) with a frequency of at least 0.03 THz and not more than 30 THz, a thermal detection sensor such as a bolometer is used in some cases. However, it is difficult to reduce noise, for example, because such a sensor is sensitive to an influence of low-frequency noise such as 1/f noise, and further it is difficult to increase a frame rate in moving-image capturing. Accordingly, in order to accelerate a terahertz wave sensor and reduce noise, a terahertz wave sensor in which an antenna receiving terahertz waves and a circuit such as a semiconductor element are combined can be considered. Another imaging device having sensitivity to terahertz waves is provided. Such an imaging device is provided with a lens in front of the terahertz wave sensor, the lens being formed of a material such as polyethylene or cycloolefin polymer that transmits the terahertz waves.

As terahertz wave sensors using conventional antennas, various terahertz wave sensors have been proposed. In such wave sensors, a loop antenna formed on the surface of a substrate and an element performing signal processing such as rectification or accumulation are connected, and they are configured as one device. For example, Japanese Patent No. 6282029 discloses a device in which a coil antenna formed on the surface of a silicon substrate (also referred to as a loop antenna) and a reception element or an oscillation element are connected to transmit and receive electromagnetic waves.

As disclosed as in Japanese Patent No. 6282029, various technologies to mount a device have been proposed. In the technologies, a loop antenna and an electrical circuit are combined on a substrate to transmit or receive radio waves with a frequency not restricted to terahertz waves. In the technologies of the related art, a direction of radio waves radiated by a loop antenna is adjusted and a current density distribution of metal lines included in a loop antenna is uniformized by forming a physical non-connection section at a part of or a plurality of sites of the metal lines included in the loop antenna. Further, by modifying a structure of the non-connection section of the metal lines included in the loop antenna, capacitive components in the non-connection section are changed to change a high-frequency electrical coupling state. The structure in which the non-connection section is formed by the metal lines included in the loop antenna, as disclosed in Japanese Patent No. 6282029, is based on a technology which can be applied to various loop antennas because a circuit can be formed on the circumference of the loop antenna in a simple structure.

When a radiation direction or a resonant frequency of a loop antenna formed on a substrate is designed, it is convenient to consider metal lines included in the loop antenna as transmission lines. In general, when an electrical signal is propagated through a transmission line, characteristic impedance of the transmission line affects a transmission speed, attenuation, or reflection of the electrical signal.

In order to inhibit reflection of an electrical signal in the middle of a transmission line, it is desirable to realize constant characteristic impedance without changing the shape of the transmission line. This is because an element such as a circuit with a characteristic impedance that is different from the characteristic impedance of the transmission line included in the loop antenna is connected to the loop antenna, reflection, attenuation, or the like of an electrical signal occurs at the connected portion, and there is a possibility of a radiation direction or a resonant frequency being disturbed.

In a structure of a non-connection section of metal lines included in a loop antenna in the technology of the related art, capacitance is formed due to the change in thickness of the metal lines included in the loop antenna or the change in a distance between a substrate and the metal lines. However, when the loop antenna is considered as a transmission line, the change in the thickness of the metal lines and the distance between the substrate and the metal lines indicates the presence of an inflection point of the characteristic impedance in the middle of a transmission path. Therefore, in the loop antenna of the technology of the related art, there is a possibility of a change in a resonant frequency by reflection, a loss by radiation, or the like occurring. When desired capacitance is not ensured in the non-connection section of the metal lines, high-frequency coupling is not sufficiently obtained. As a result, in the loop antenna of the technology of the related art, there is a possibility of a resonant frequency deviating from a designed value and there is a possibility of the radiation direction of the loop antenna deviating from a vertical direction of the surface of the substrate on which the loop antenna is formed.

Because radiation resistance of the loop antenna which is one index indicating antenna radiation efficiency is higher as an antenna line is slender, slenderizing the metal lines can be one measure of forming a loop antenna with high radiation efficiency. However, when the metal lines are slenderized, facing surfaces of the mutual metal lines in the non-connection section cannot be wide. Therefore, it is difficult to achieve a shape in which sufficient capacitive coupling is obtained.

To supply power to an element such as an electrical circuit connected to a loop antenna via the loop antenna, metal lines are drawn from parts of the loop antenna to be connected to a power supply. In such a configuration, impedance of the drawn line connecting the loop antenna to the power supply and impedance of an element such as an electrical circuit can disturb characteristic of the loop antenna. When high-frequency connection of the metal lines formed in the loop antenna via capacitance by the non-connection section is insufficient, there is a possibility of impedance of a peripheral structure including the drawn lines disturbing the characteristic of the loop antenna. As a result, there is a possibility of the resonant frequency or the radiation direction of the loop antenna being changed from the designed value.

The technology of the present disclosure has been devised in view of the above circumstances and an objective of the present disclosure is to provide an element capable of achieving a designed resonant frequency and radiation direction with a small disturbance element when a loop antenna is used as an element receiving and transmitting terahertz waves.

SUMMARY OF THE INVENTION

It is provided an element including a loop antenna configured to include first and second metal lines on a surface of a substrate on or from which terahertz waves are incident or emitted, and a rectifying element or an oscillation element electrically connected to the first and second metal lines. The element has a facing section at which a first surface of a first end not connected to the rectifying element or the oscillation element at an end of the first metal line faces a second surface of a second end not connected to the rectifying element or the oscillation element at an end of the second metal line, a direction in which the first surface faces the second surface is a direction in which the first end extends and is a direction intersecting a direction in which the second end extends, the first end has a third surface opposite to a side on which the first surface faces the second surface, the second end has a fourth surface opposite to a side on which the second surface faces the first surface, and a distance between the third and fourth surfaces in the direction in which the first surface faces the second surface is greater than a sum value of a thickness of the first metal line and a thickness of the second metal line. In addition, it is provided an image forming device including the element as described above.

Further features of the present invention will become apparent from the following description of exemplary embodiments with reference to the attached drawings.

DESCRIPTION OF THE EMBODIMENTS

Hereinafter, preferred embodiments of the technology according to the present disclosure will be described with reference to the drawings. Here, dimensions, materials, shapes, relative dispositions, and the like of constituent components to be described below are appropriately changed depending on various conditions or configurations of devices to which the present invention is applied. Accordingly, the scope of the present invention is not limited to the following description. In particular, general or known technologies of the technology fields can be applied to configurations or processes which are not illustrated and described. Repeated description will be omitted in some cases.

First Embodiment

Figure 1:
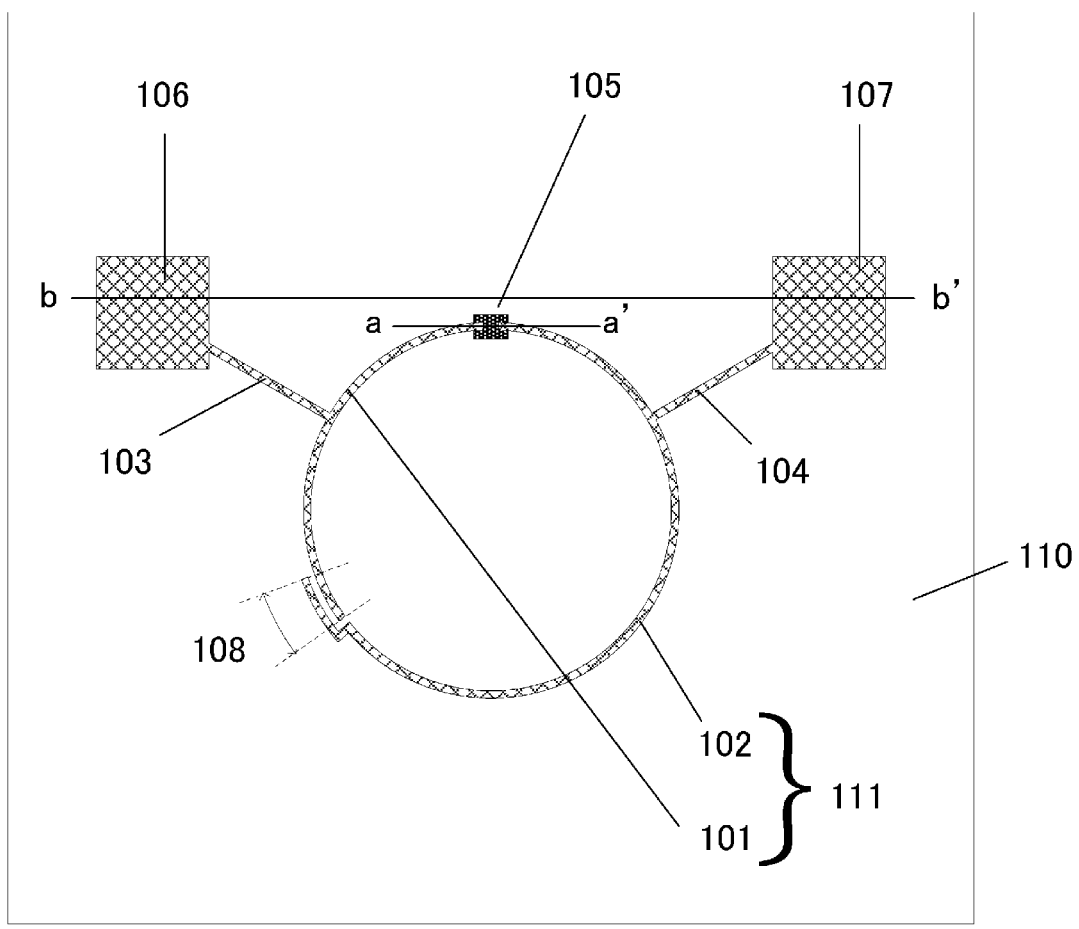
FIG. 1 is a schematic diagram illustrating a configuration of a terahertz wave sensor according to an embodiment.

FIG. 1 is a diagram illustrating an exemplary schematic configuration of a terahertz wave sensor according to a first embodiment when a driving circuit substrate is viewed from above. In FIG. 1, the driving circuit substrate is a substrate formed of a semiconductor such as silicon and an insulating film 110 is formed on a surface (a sheet surface) of the driving circuit substrate. On the surface of the substrate, two metal films 101 and 102 included in a circular loop antenna 111 are formed in the insulating film 110. The two metal films 101 and 102 are electrically connected via a rectifying element 105. The metal films 101 and 102 are examples of first and second metal lines. The rectifying element 105 can be manufactured in a general semiconductor processing step. A drawn line 103 is formed to electrically connect a metal pad 106 to the metal film 101 and a drawn line 104 is formed to electrically connect a metal pad 107 to the metal film 102. An external circuit such as a current source or a voltage source is connected to the metal pads 106 and 107. Thus, the drawn lines 103 and 104 are connected to an external circuit adjusting a voltage or a current via the metal pads 106 and 107.

In the present embodiment, in order for the loop antenna 111 to receive terahertz waves which are radio waves (electromagnetic waves) with a frequency of at least 0.03 THz and not more than 30 THz, the rectifying element 105 is electrically connected to the loop antenna 111. As the rectifying element 105, a Schottky barrier diode or a pn junction diode can be used. By using an oscillation element instead of the rectifying element 105, it is possible to emit terahertz waves from the loop antenna 111.

The drawn lines 103 and 104 are not limited to the shape illustrated in FIG. 1 and any of various shapes can be adopted. By connecting the drawn lines 103 and 104 near a node of an electric field distribution on the loop antenna 111 at the time of a resonant state of the loop antenna 111, it is possible to further stabilize a resonant frequency or a radiation direction which is a characteristic of the loop antenna 111. The node of the electric field distribution can be calculated using impedance of the rectifying element 105 electrically connected to the loop antenna 111, a thickness and a dielectric constant of the insulating film 110 electrically insulating the loop antenna 111 from a substrate 109, and a dielectric constant of the substrate 109. The node of the electric field distribution on the loop antenna 111 is also a position at which a voltage value of a voltage applied to the loop antenna 111 is the minimum.

Figure 2:
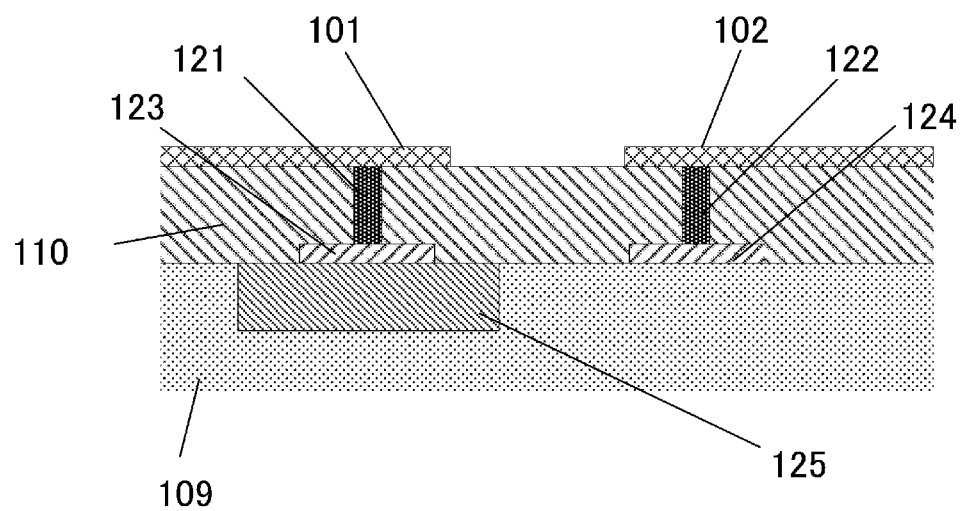
FIG. 2 is a schematic diagram illustrating a configuration of connection between a loop antenna and a circuit according to the embodiment.

A cross-sectional surface along the line a-a' of the rectifying element 105 in FIG. 1 is illustrated in FIG. 2. The rectifying element 105 includes the substrate 109, a contact region 125, and electrodes 123 and 124, the contact region 125 being manufactured on the substrate 109 using a technology such as ion implantation or epitaxy, and the electrodes 123 and 124 coming into contact with the substrate 109 and the contact region 125. A Schottky barrier diode, a pn junction diode, or the like can be manufactured in accordance with a scheme of the related art such as changing of an impurity density or impurity type of contact region 125.

The electrodes 123 and 124 of the rectifying element 105 are respectively electrically connected to the metal films 101 and 102 via through electrodes 121 and 122. When the substrate 109 is a semiconductor substrate, the rectifying element 105 can also be manufactured directly on the substrate 109. When another material such as glass is used for the substrate 109, a semiconductor element that has a rectifying function or the like may be mounted on the substrate 109.

By adjusting the lengths of the metal films 101 and 102 included in the loop antenna 111, it is possible to change the length of the circumference (a circumferential length) of the loop antenna 111 which is a resonator length and adjust a resonant frequency of the loop antenna 111 to a desired value. Specifically, for a wavelength ($\lambda$) of radio waves with a frequency selected as the resonant frequency, the circumferential length of the loop antenna 111 is set to a length of about $(n+0.5)\times\lambda$ (where n is 0 or a natural number) such as a $0.5\lambda$, $1.5\lambda$, or $2.5\lambda$. The wavelength of radio waves used to determine the circumferential length of the loop antenna 111 herein can be indicated by a combined value of relative dielectric constants of the substrate 109, the insulating film 110, and the atmospheric air surrounding the loop antenna 111. Due to a capacitive component of the rectifying element 105 connected to the loop antenna 111 and a capacitive component of the metal films 101 and 102 included in the loop antenna 111 with respect to the substrate 109, a signal delay occurs in a transmission line included in the loop antenna 111. Therefore, in order to obtain a desired resonant frequency in the loop antenna 111, it is necessary to adjust the circumferential length.

In the present embodiment, when a terahertz wave sensor is used for an imaging device, it is desirable to adjust a radiation pattern of the loop antenna 111 in the vertical direction of the substrate. Further, in order to adjust the radiation pattern of the loop antenna 111 in the vertical direction of the substrate, it is desirable to set the circumferential length of the loop antenna 111 to $1.5\lambda$ of the wavelength $\lambda$, of the resonant frequency which is a designed value.

Figure 3:
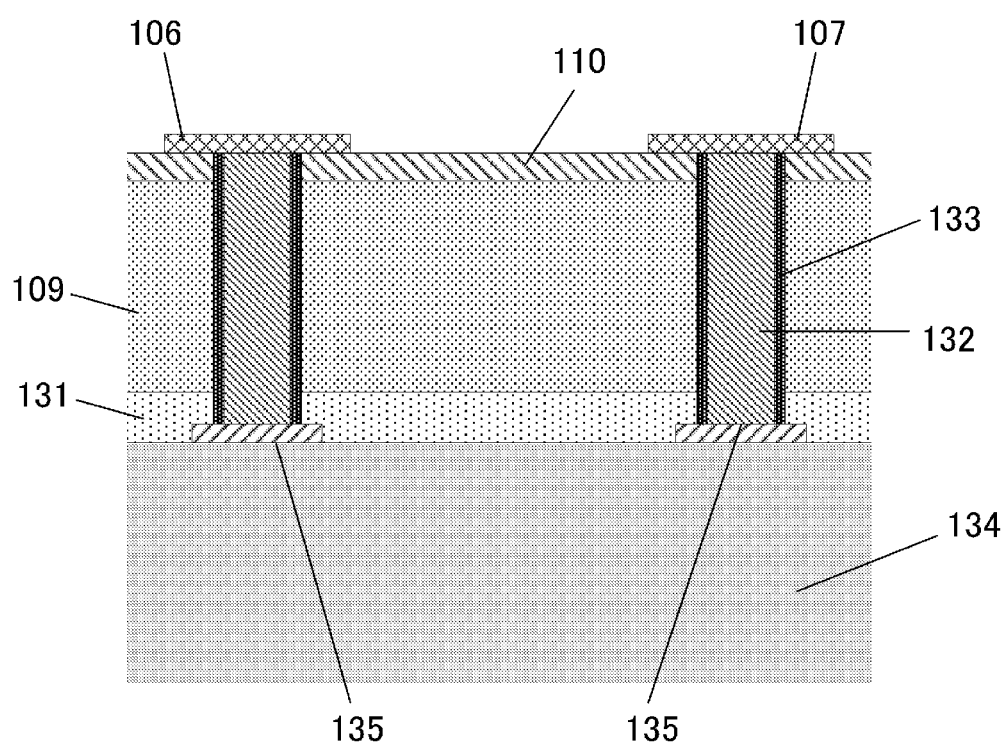
FIG. 3 is a schematic diagram illustrating a configuration of connection between a substrate and a circuit substrate according to the embodiment.

The rectifying element 105 is driven by supplying a current or a voltage to the rectifying element 105 from an external circuit such as a current source or a voltage source connected to the metal pads 106 and 107. The external circuit adjusting a voltage or a current and the rectifying element 105 are connected to the metal pads 106 and 107 in accordance with any of various methods such as wire bonding. FIG. 3 illustrates a cross-sectional view along the line b-b' of FIG. 1. As illustrated in FIG. 3, the substrate 109 on which the loop antenna 111 and the like are formed and a substrate 134 on which a circuit (not illustrated) adjusting a voltage or a current is formed are joined via an adhesive 131. Through electrodes 132 penetrating through the substrate 109 are formed on the rear surfaces (surfaces in the lower direction of the sheet surface of FIG. 3) of the metal pads 106 and 107. The through electrode 132 and the substrate 109 are insulated by an insulating film 133, and the substrate 109 is connected to an electrically floating or general ground (GND) potential. The through electrode 132 is electrically connected to an electrode 135 formed on the substrate 134 and the rectifying element 105 can be driven by a circuit on the substrate 134.

Terahertz waves incident from the surface of the substrate 109 (the surface in the upper direction of the sheet surface of FIG. 3) are received by the loop antenna 111 and the rectifying element 105 connected to the loop antenna 111 generates a wave detection current. The generated wave detection current flows to a circuit (not illustrated) formed on the substrate 134 via the through electrode 132. This circuit performs processing to convert the flowing current into a voltage value or processing such as signal amplification and outputs a signal to an input and output terminal (not illustrated).

As illustrated in FIG. 1, a facing section 108 in which the metal films 101 and 102 are mutually coupled by capacitive coupling and inductive coupling is formed in at least parts of the metal films 101 and 102. Thus, the metal films 101 and 102 and the rectifying element 105 are coupled at the facing section 108 to form the high-frequency loop antenna 111 at a high frequency. It is more preferable to form the facing section 108 so that a node of a current density distribution on the loop antenna 111 is included at the time of a resonant state of the loop antenna 111. In such a configuration, it is possible to further stabilize the resonant frequency or the radiation direction of the loop antenna 111. The node of the current density distribution on the loop antenna 111 is also a position at which a current value of a current applied to the loop antenna 111 is the minimum. The node of the current density distribution can be calculated using impedance of the rectifying element 105 electrically connected to the loop antenna 111, the thickness and the dielectric constant of the insulating film 110 electrically insulating the loop antenna 111 from the substrate 109, and the dielectric constant of the substrate 109.

Figure 4A:
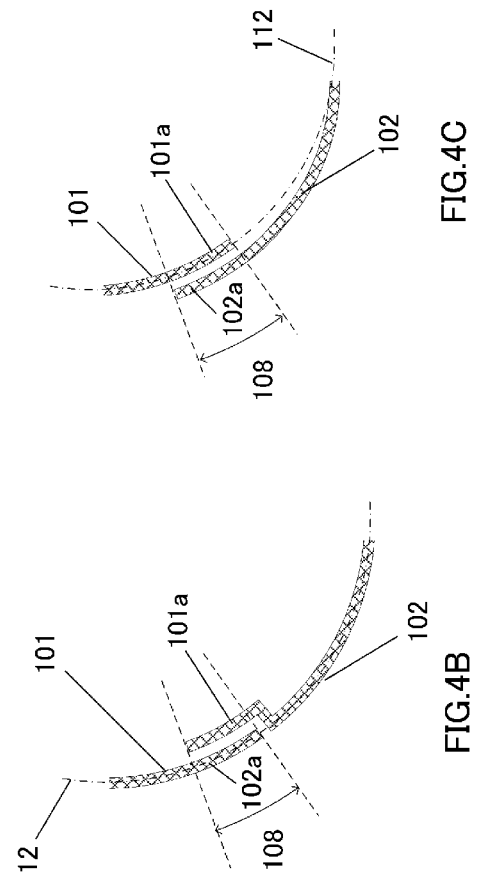
FIGS. 4A to 4F are diagrams illustrating facing sections of loop antennas according to the embodiment.
Figure 4B:
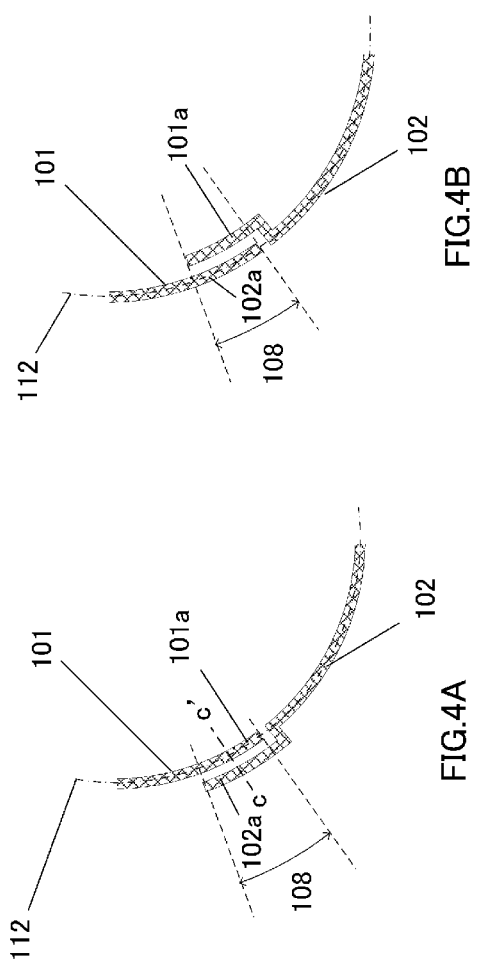
Figure 4C:
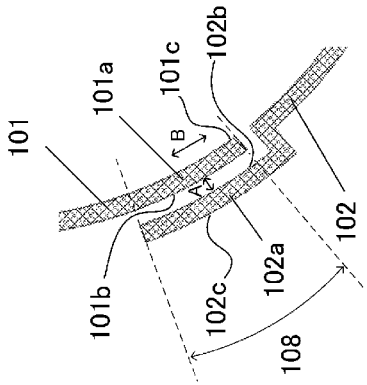

The capacitive coupling and inductive coupling are generated in the facing section 108 in the present embodiment. FIGS. 4A to 4E exemplify specific shapes of the facing section 108 formed by the metal films 101 and 102 disposed on the substrate 109. FIG. 4A is an enlarged view illustrating the facing section 108 illustrated in FIG. 1. FIG. 4F is a further enlarged view illustrating the facing section 108 of FIG. 4A. As illustrated in FIG. 4F, an end 101a of the metal film 101 and an end 102a of the metal film 102 are disposed in the facing section 108. The end 101a is an example of a first end and the end 102a is an example of a second end. The end 101a has a first surface 101b facing the end 102a and the end 102a has a second surface 102b facing the end 101a. Further, the end 101a has a third surface 101c opposite to a side on which the first surface 101b faces the second surface 102b of the end 102a. Similarly, the end 102a has a fourth surface 102c opposite to a side on which the second surface 102b faces the first surface 101b of the end 101a.

In the present embodiment, a direction in which the first surface 101b faces the second surface 102b (see the double-headed arrow A in FIG. 4F) intersects to be perpendicular to a direction in which the end 101a extends and a direction in which the end 102a extends (see the double-headed arrow B in FIG. 4F). A distance between the third surface 101c and the fourth surface 102c in the direction in which the first surface 101b faces the second surface 102b is set to be greater than a sum value of a thickness of the metal film 101 and a thickness of the metal film 102.

The metal films 101 and 102 extend on the same curve 112 to form the loop antenna 111. However, when the metal films 101 and 102 come into contact with each other, there is a possibility of a wave detection function of the circuit such as the rectifying element 105 disappearing due to electrical conduction. Accordingly, the distance between the third surface 101c and the fourth surface 102c is set to about a distance in which high-frequency coupling is achieved, and a mutual non-connection section is formed in the metal films 101 and 102. When the mutual non-connection section is formed using a technology of the related art, a structure in which the metal film 101 faces the metal film 102 within a range in which the metal films do not deviate from the curve 112 forming the loop antenna 111 to achieve capacitive coupling between the metal films 101 and 102 is adopted. In this case, however, there is rarely an inductive coupling component and the metal films 101 and 102 have complex shapes in the non-connection section to obtain coupling.

In the present embodiment, the facing section 108 formed by the metal films 101 and 102 can have various shapes. For example, as illustrated in FIGS. 4A and 4B, the metal film 101 on one side extends along the curve 112 and the other metal film 102 on the other side has a bent portion so that the metal film 102 extends while deviating from the curve 112. In FIG. 4A, the end 102a of the metal film 102 extends while deviating outside the curve 112. In FIG. 4B, the end 102a of the metal film 102 extends which deviating inside the curve 112. In FIGS. 4A and 4B, the bent portion of the metal film 102 is bent at a right angle at two positions of the metal film 102, and the ends 101a and 102a are formed to extend in parallel in the facing section 108. In order to inhibit an influence of reflection occurring in the bent portion, as illustrated in FIG. 4C, the metal film 102 may have a shape extending while deviating gently from the curve 112 so that the metal film 102 has no bent portion. In this case, metal films 101 and 102 may be formed such that both of the metal films 101 and 102 extend while deviating gently from the curve 112. That is, in the case of FIG. 4C, the metal films 101 and 102 are formed not to overlap each other without being bent. Alternatively, the bent portion in FIG. 4A or 4B may be bent at a smaller bending angle instead of bending the metal film 102 at the right angle and the bent portion may have a more gently bent shape.

Figure 4D:
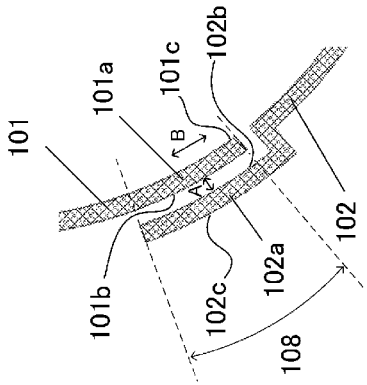
Figure 4E:
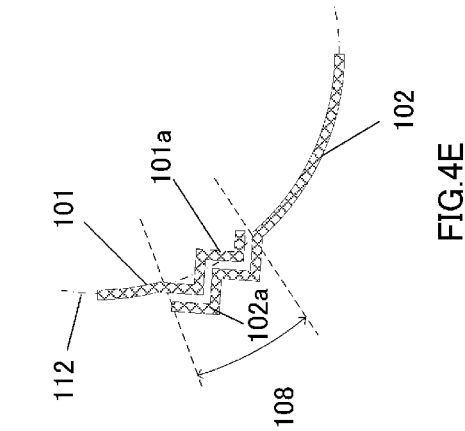
Figure 4F:
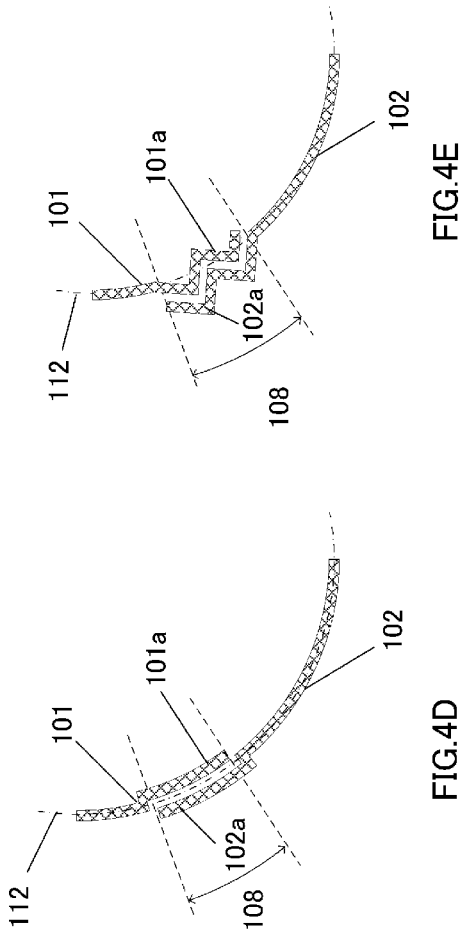

Alternatively, as illustrated in FIG. 4D, the bent portions may be formed in the metal films 101 and 102, and both of the metal films 101 and 102 may extend while deviating from the curve 112. In FIG. 4D, the end 101a of the metal film 101 on one side deviates inside the curve 112 and the end 102a of the metal film 102 on the other side deviates outside of the curve 112. The end 101a of the metal film 101 may deviate outside of the curve 112 and the end 102a of the metal film 102 may deviate inside the curve 112. As illustrated in the drawing, the bent portion may be bent at a right angle in two positions of the metal film or may be bent at a smaller bending angle to have a more gently bent shape. Accordingly, the metal film 101 (102) can be large, as illustrated in FIGS. 4A to 4C, to form the facing section 108 without deviating from the curve 112. Alternatively, as illustrated in FIG. 4E, in the facing section 108, the metal films 101 and 102 may be shaped to have meandering portions that meander and extend in parallel to each other. In this case, in the facing section 108, the metal films 101 and 102 are formed so that the ends 101a and 102a are bent and extend in parallel. Accordingly, a region in which the facing section 108 is formed can be less than a circumferential length of the loop antenna 111. In the case illustrated in FIG. 4E, because the capacitive coupling and inductive coupling are generated in the length in which the metal film 101 faces the metal film 102 in the facing section 108, a coupling amount which is as large as possible can be achieved while reducing the facing section 108.

In the present embodiment, as illustrated in FIGS. 2 and 3, the metal films 101 and 102 are formed as flat metal films on the substrate 109. Accordingly, in addition to the above configuration, the two metal films 101 and 102 may have substantially the same thickness and width. Accordingly, the thicknesses of the metal films 101 and 102 in the facing section 108 are within ranges determined by average values or standard deviations of the thicknesses in the entire lengths of the metal films 101 and 102. This range can be expressed by (an average value of the thickness in the entire length of the metal film)+(a standard deviation of the thickness in the entire length of the metal film) and/or (an average value of the thickness in the entire length of the metal film)−(a standard deviation of the thickness in the entire length of the metal film). Thus, a uniform transmission line that has constant characteristic impedance can be obtained in the extending direction of the metal films 101 and 102. Thus, it is less likely that the thickness of the metal film changes or a distance between the substrate and the metal film changes. A signal is less likely reflected in the transmission line formed by the metal films 101 and 102 and it is possible to obtain the loop antenna 111 in which the resonant frequency or the radiation direction is further stabilized.

In the shape of the facing section 108, as exemplified in FIGS. 4A to 4E, the metal films 101 and 102 have a pair of surfaces facing each other to form the capacitive coupling in the facing section 108. Further, in the facing section 108, the metal films 101 and 102 are formed to face each other to extend in parallel to the curve 112 forming the loop antenna 111. That is, because the extending direction of the curve 112 is also a direction in which a current flows, the metal films 101 and 102 face each other in this direction to generate inductive coupling. As a result, it is possible to achieve the sufficient coupling for the loop antenna more reliably than in the technology of the related art.

Figure 5:
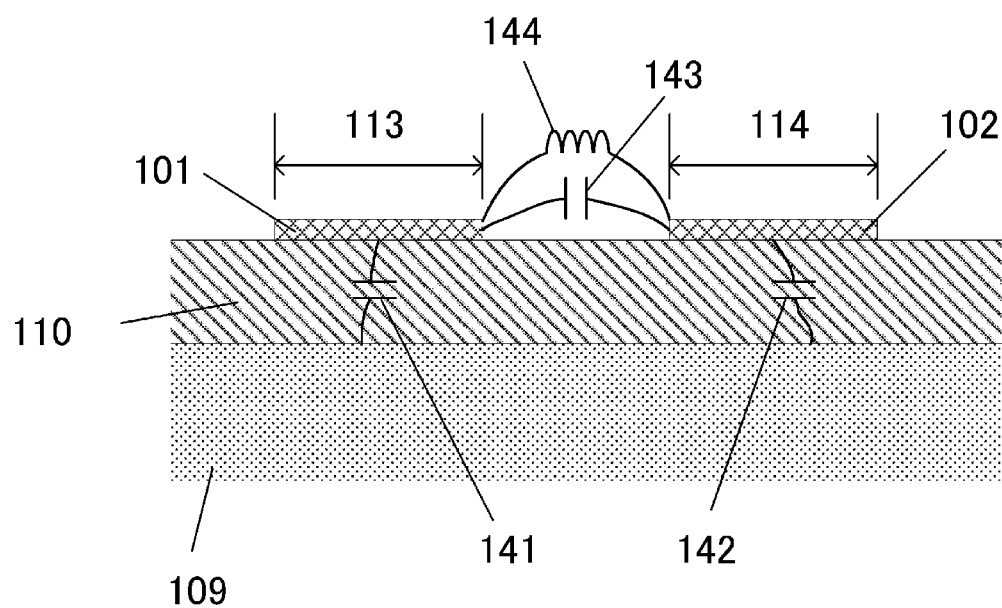
FIG. 5 is a graph illustrating an electrical relation between the loop antenna and the substrate according to the embodiment.

FIG. 5 is a sectional view along the like c-c' of FIG. 4A. Because the metal films 101 and 102 are each disposed on the substrate 109 via the insulating film 110, the transmission line that has distributed-constant capacitances 141 and 142 is formed. Further, in a high-frequency region, inductive coupling 144 is formed in addition to capacitive coupling 143 in the facing section 108.

Next, a loop antenna 111 that has high radiation efficiency useful in the above configuration according to the present embodiment will be described. In general, radiation efficiency $\eta$ of the antenna is expressed using a radiation resistance $R_R$ of the antenna and a loss resistance $R_L$ of the antenna as in Expression (1).

[Math. 1]

$$\eta = \frac{R_R}{R_R + R_L} \qquad (1)$$

That is, as the radiation resistance is greater than the loss resistance, the radiation efficiency is improved.

The radiation resistance of the loop antenna 111 which is one index expressing the radiation efficiency increases as the metal lines included in the loop antenna 111 are thinner. That is, when the loop antenna 111 is used as an antenna that emits a terahertz wave, a radiation intensity of the terahertz waves radiated from the loop antenna 111 can be intensified by narrowing widths 113 and 114. As a result, when the loop antenna 111 is used as a reception antenna, a reception intensity can be intensified.

As in the technology of the related art, when two metal films are disposed to face each other and extend along the same curve, the area of the surfaces of the metal films that face in the non-connection section of the loop antenna is difficult to be made sufficiently wide and it is difficult to obtain sufficient coupling. This is because the width of the two metal films is substantially the same as the distance of the mutual metal films in the loop antenna using the thin metal lines close to a processing limit, and thus obtained capacitance is settled down to substantially the same value not depending on the shape.

However, as in the shape of the facing section 108 according to the present embodiment, the metal films 101 and 102 face each other and extend in parallel along the curve 112 forming the loop antenna 111, and thus the curve 112 serves as a direction in which a current flows. The metal films 101 and 102 facing each other in this direction form the inductive coupling 144 in addition to the capacitive coupling 143. As a result, it is possible to manufacture the loop antenna 111 capable of obtaining sufficient high-frequency coupling.

Figure 6:
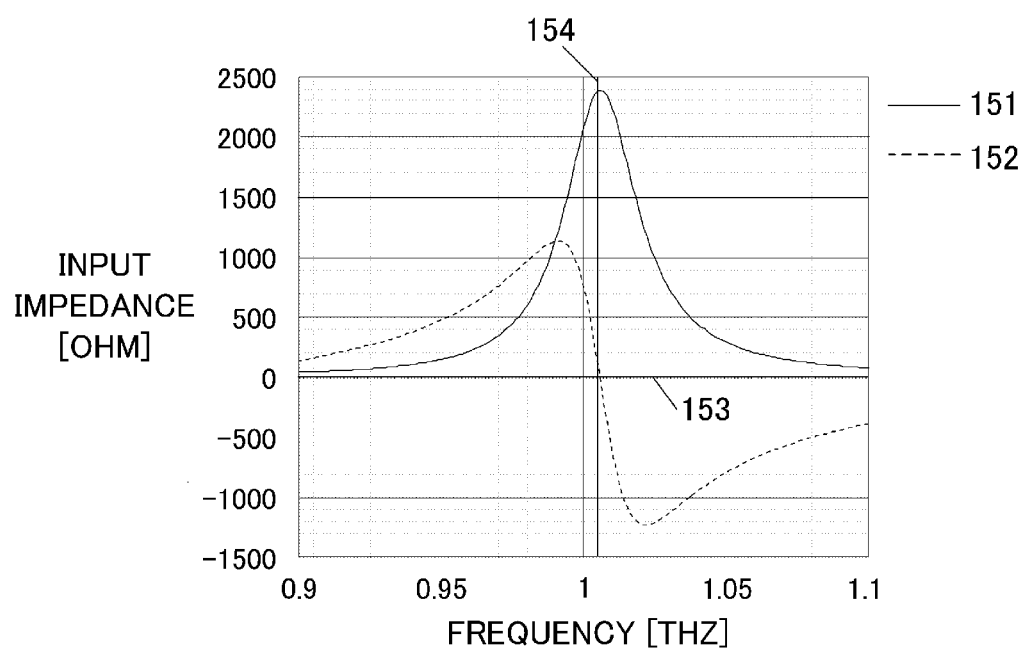
FIG. 6 is a diagram illustrating a general resonant frequency of the loop antenna according to the embodiment according to the embodiment.

Next, the shape of the facing section 108 which can be adopted in the present embodiment will be described. First, a method of calculating a resonant frequency of a general antenna will be described with reference to a graph of input impedance of an antenna illustrated in FIG. 6. In the graph of FIG. 6, the horizontal axis represents a frequency and the vertical axis represents impedance, and a relation between a real part 151 of input impedance of the antenna and an imaginary part 152 of the input impedance is indicated. In general, resonance is considered to be generated at a frequency at which the imaginary part of the input impedance of the antenna is 0Ω. Accordingly, in the following description, a frequency on the vertical axis of the graph passing through an intersection between the imaginary part 152 of the input impedance of the antenna and impedance 153 of 0Ω is assumed to be resonant frequency 154 that the antenna has. In the following description, the resonant frequency is assumed to be a frequency requested in this scheme. In the present embodiment, overall impedance may change due to connection of the rectifying element 105 or the like on the loop antenna 111 and may resonate at a different frequency from the resonant frequency 154. However, it is not inappropriate to describe a coupling state in the facing section 108 in the present embodiment.

Figure 7:
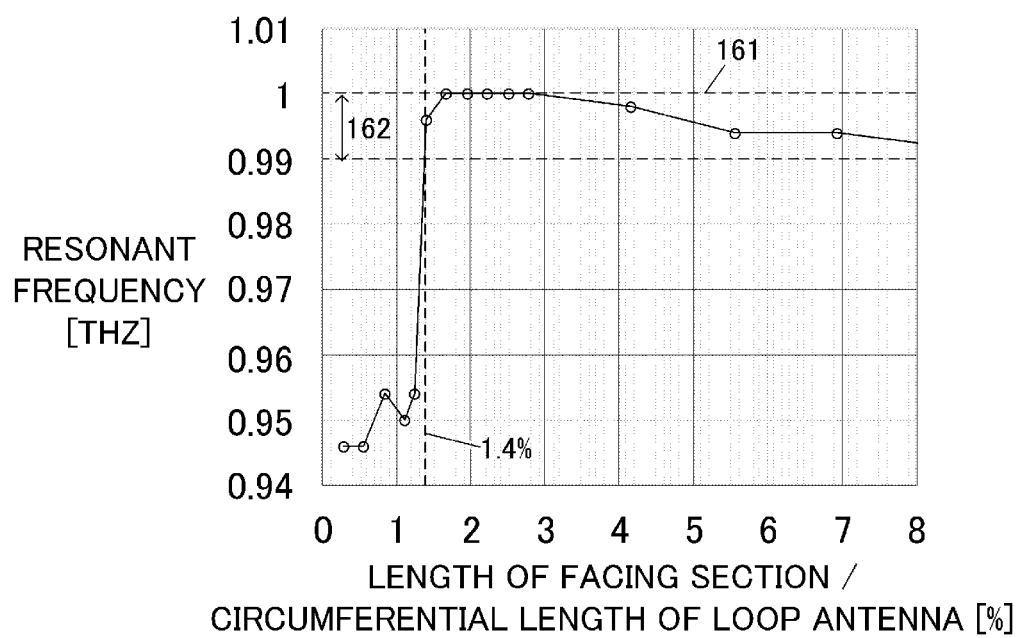
FIG. 7 is a diagram illustrating a relation between the length of a facing section and a resonant frequency according to the embodiment.

Here, the length of the facing section 108 is preferably a length within a range of 1.4% to 7% of the circumferential length of the loop antenna 111. The reason will be described. The length of the facing section 108 is set to a length between the front end of the end 101a of the metal film 101 and the front end of the end 102a of the metal film 102 along the curve 112, as illustrated in FIGS. 4A to 4F. As the length of the facing section 108, a length between the front end of the end 101a of the metal film 101 and the front end of the end 102a of the metal film 102 along the metal films 101 and 102 may be used. FIG. 7 is a graph in which the resonant frequency of the loop antenna 111 is plotted. In the graph of FIG. 7, the horizontal axis represents a ratio of the length of the facing section 108 to the circumferential length of the loop antenna 111 and the vertical axis represents a resonant frequency. A deviation width 162 of −1% from a designed frequency 161 is assumed to be a range allowed as a specification of an antenna in the present embodiment. In general, an index of a Q value in a case in which the loop antenna 111 is used as a reception antenna is derived from an S value indicating the degree of impedance matching between the loop antenna 111 and the rectifying element 105. Alternatively, the index is derived from a value of a voltage standing wave ratio (VSWR). Because a Q value is in the range of about 50 to 100, the antenna with the specification within the deviation width of −1% from the designed frequency can be set as an allowed antenna, as described above.

In the present embodiment, the length of the facing section 108 in the extending direction of the loop antenna 111 is adjusted by stretching the metal film 102 in the extending direction of the loop antenna 111. The deviation from the designed frequency 161 is more apparent as the length of the facing section 108 is shorter. In the specification allowed in the present embodiment, the length of the facing section 108 is required to be equal to or greater than 1.4% of the circumferential length of the loop antenna 111. This is because sufficient coupling at a high frequency is not achieved when the length of the facing section 108 is short. When the length of the facing section 108 is short, the resonant frequency easily depends on a plurality of factors such as the lengths of the metal films 101 and 102 included in the loop antenna 111 and it is more difficult to design the resonant frequency. Further, an operation of a device including the manufactured antenna also becomes unstable due to coexistence of a plurality of resonant frequencies.

By setting the length of the facing section 108 to be equal to or greater than 1.4% of the circumferential length of the loop antenna 111, it is possible to manufacture the loop antenna 111 that has a resonant frequency within the deviation width of −1% from the designed frequency 161. When the length of the facing section 108 is set to be equal to or greater than 3% of the circumferential length of the loop antenna 111, the deviation width grows gradually from the designed frequency 161. This is because the capacitance 142 formed by the metal film 102 and the substrate 109 illustrated in FIG. 5 increases when the facing section 108 is lengthened. When capacitance is inserted into the transmission line, it is well known that the same result as a result obtained by extending the transmission line is obtained due to delay of an electrical signal delivered along the transmission line.

As illustrated in FIG. 7, because an insufficient high frequency coupling state in the technology of the related art is improved due to the capacitive coupling and the inductive coupling in accordance with the shape of the facing section 108 in the present embodiment, the resonant frequency characteristic of the loop antenna 111 can be expected to be more stable. Because the mutual capacitive coupling and inductive coupling of the metal films 101 and 102 can be sufficiently obtained, a possibility of reflection or the like is inhibited at the ends at which the metal films 101 and 102 are interrupted in the facing section 108. In the present embodiment, because a standardized value obtained by comparing the length of the facing section 108 with the circumferential length of the loop antenna 111 is used, the loop antenna 111 with any of various shapes can be adopted.

Figure 8B:
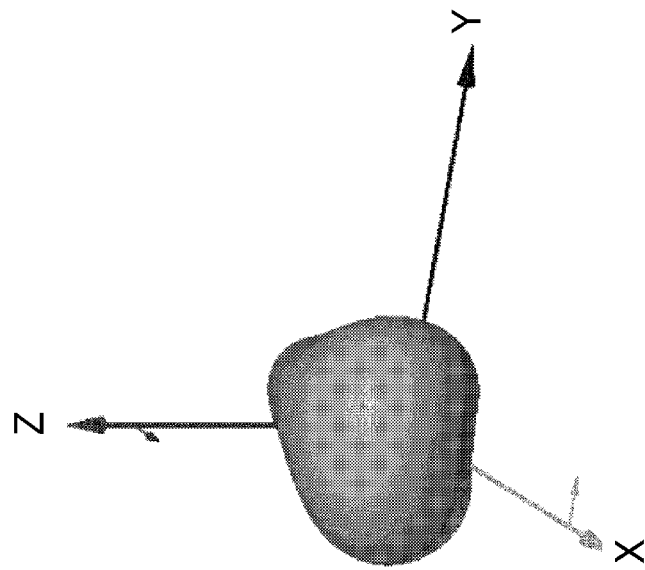
FIGS. 8A and 8B are diagrams illustrating comparison between a radiation pattern of a loop antenna applied to a terahertz wave sensor and a radiation pattern of a loop antenna not applied to the terahertz wave sensor according to the embodiment.
Figure 8A:
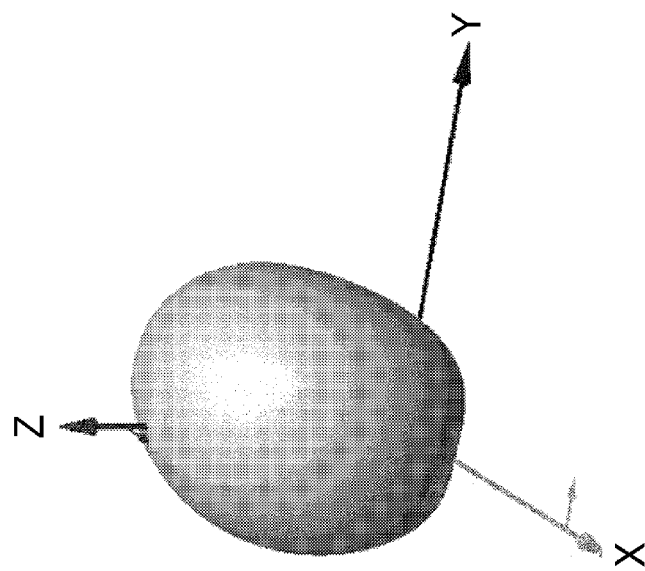

Next, the reason why an appropriate length of the facing section 108 is a length equal to or less than 7% of the circumferential length of the loop antenna 111 will be described. FIGS. 8A and 8B illustrate results obtained by analyzing a relation between the length of the facing section 108 and a radiation pattern of the loop antenna 111 according to the present embodiment using HFSS (an electromagnetic field simulator) manufactured by ANSYS Inc. FIG. 8A is a diagram when the length of the facing section 108 is set to 2% of the circumferential length of the loop antenna 111 and FIG. 8B is a diagram when the length of the facing section 108 is set to 10% of the circumferential length of the loop antenna 111.

In FIGS. 8A and 8B, the same scale is used. In the radiation pattern, the vertical direction to the upper surface of the substrate 109 matches the Z axis direction in the drawings. Thus, a relation between an incidence direction of the terahertz waves and a reception sensitivity of the loop antenna 111 is understood using the substrate 109 as a standard. Because a basic antenna characteristic of the radiation pattern or the like is the same between cases in which the antenna is used for both transmission and reception, the relation between the radiation direction and the reception sensitivity of the antenna can be understood from the radiation pattern of the antenna.

In the loop antenna 111 illustrated in FIG. 8A, the radiation pattern is oriented in the vertical direction to the upper surface of the substrate and large strain does not occur. Meanwhile, in the loop antenna 111 illustrated in FIG. 8B, the radiation pattern is smaller than the radiation pattern in FIG. 8A and the shape of the radiation pattern is further distorted. In the case of FIG. 8B, the sensitivity of the loop antenna 111 is found to be small from the radiation pattern smaller than in the case of FIG. 8A. In the case of FIG. 8B, the shape of the radiation pattern is further distorted than in the case of FIG. 8A. Thus, it is found that the loop antenna 111 in FIG. 8B is not appropriate to be used for a terahertz wave sensor.

That is, the reception sensitivity deteriorates as the length of the facing section 108 is longer. Therefore, it is desirable to set the length of the facing section 108 to an appropriate length. It is considered that the reception sensitivity deteriorates because the capacitive coupling 143 and the inductive coupling 144 increase by lengthening the facing section 108, which results in a power loss (damage).

Figure 9:
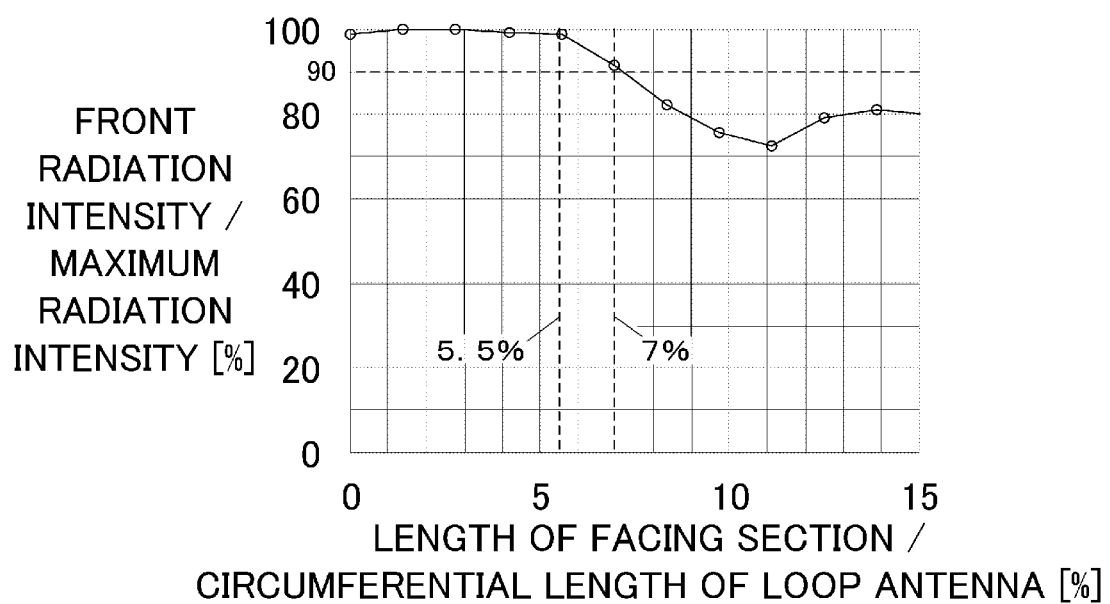
FIG. 9 is a diagram illustrating a relation between the length of a facing section of a terahertz wave sensor and a front radiation intensity according to the embodiment.

FIG. 9 is a graph showing a relation between a ratio of the length of the facing section 108 to the circumferential length of the loop antenna 111, as represented on the horizontal axis, and a ratio of a front radiation intensity of the loop antenna 111 to a maximum radiation intensity of the radiation pattern, as represented on the vertical axis. Here, the front radiation intensity of the loop antenna 111 is a radiation intensity in the vertical direction to the upper surface of the substrate 109. In FIG. 9, when a ratio of the front radiation intensity of the loop antenna 111 to the maximum radiation intensity of the radiation pattern is 100%, the radiation pattern is oriented substantially in a substrate vertical direction. When this ratio is less than 100%, the maximum direction of the radiation pattern can deviate in the vertical direction to the upper surface of the substrate and the radiation pattern is distorted. In the present embodiment, a range in which this ratio is 90% to 100% is assumed to be a range allowed as the specification of the loop antenna 111.

In the present embodiment, the length of the facing section 108 is adjusted by stretching the metal film 102 in the extending direction of the curve 112 of the loop antenna 111. It is found that the radiation direction of the radiation pattern is oriented substantially in the vertical direction to the upper surface of the substrate when the length of the facing section 108 is short. When the length of the facing section 108 exceeds 5.5% of the circumferential length of the loop antenna 111, it is found that the radiation direction of the radiation pattern misses in the vertical direction to the upper surface of the substrate and the radiation pattern is distorted. Further, when the front radiation intensity is 90% of the maximum radiation intensity in FIG. 9, it is found that the length of the facing section 108 is 7% of the circumferential length of the loop antenna 111. That is, when the length of the facing section 108 exceeds 7% of the circumferential length of the loop antenna 111, the radiation direction of the radiation pattern of the loop antenna 111 misses in the vertical direction to the upper surface of the substrate and the radiation pattern is distorted. The loop antenna 111 that has the length of the facing section 108 is not appropriate to be used for the terahertz wave sensor.

Figure 10:
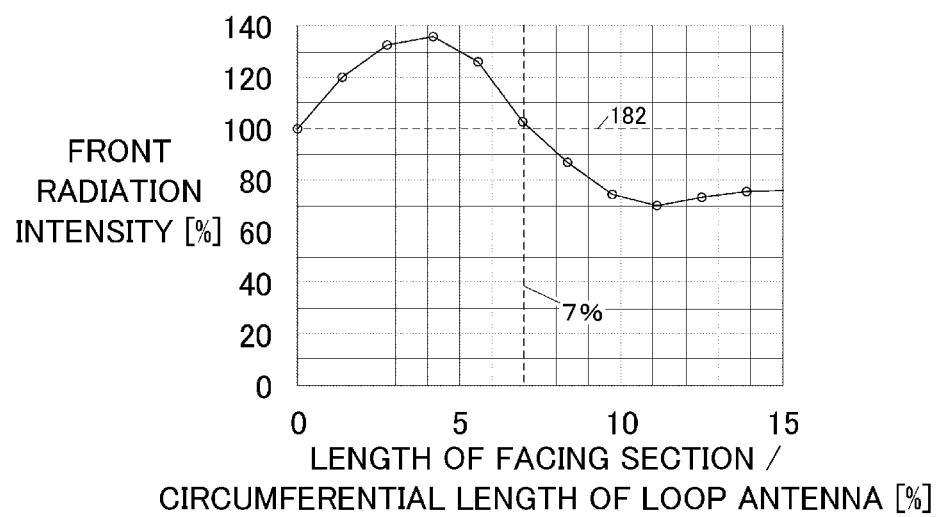
FIG. 10 is a diagram illustrating a relation between the length of a facing section and a front radiation intensity according to the embodiment.

FIG. 10 is a graph showing a relation between a ratio of the length of the facing section 108 to the circumferential length of the loop antenna 111, as represented on the horizontal axis, and the front radiation intensity which is a radiation intensity in the vertical direction to the upper surface of the substrate, as represented on the vertical axis. The graph illustrated in FIG. 10 is shown by a percentage in which the front radiation intensity is a standard when the ratio of the length of the facing section 108 to the circumferential length of the loop antenna 111 is 4%.

In the case illustrated in FIG. 10, it is found that the same front radiation intensity as the front radiation intensity 182 at 100% equivalent to a configuration in which the facing section 108 is not formed is achieved when the ratio of the length of the facing section 108 to the circumferential length of the loop antenna 111 is 7%. That is, when the length of the facing section 108 exceeds 7% of the circumferential length of the loop antenna 111, the sensitivity of the loop antenna 111 is not appropriate for the terahertz wave sensor. The ratio of the length of the facing section 108 to the circumferential length of the loop antenna 111 is preferably equal to or less than 7% and is more preferably equal to or less than 5.5%. Accordingly, the length of the first end in the facing section is preferably 1.4% to 7% of the length of the loop antenna in a direction parallel to the surface of the substrate and is more preferably 1.4% to 5.5%.

Figures 11A, 11B:
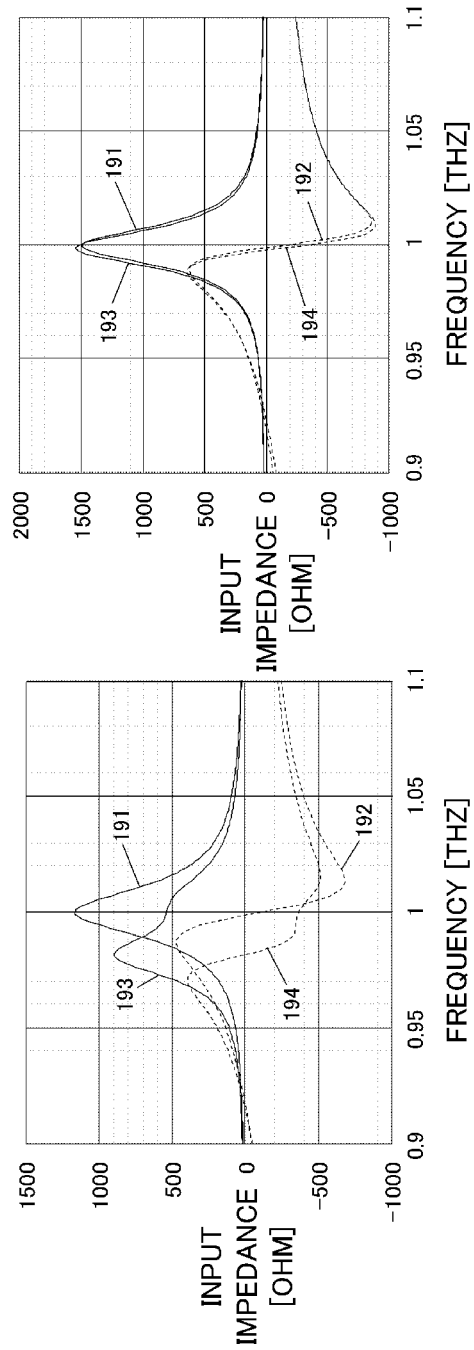
FIGS. 11A and 11B are diagrams illustrating comparison between a resonant frequency of a loop antenna applied to a terahertz wave sensor and a resonant frequency of a loop antenna not applied to the terahertz wave sensor.

In FIGS. 11A and 11B, the input impedance of the antenna before and after the connection of the drawn lines 103 and 104 is each illustrated when the ratio of the length of the facing section 108 to the circumferential length of the loop antenna 111 is applied as described above in the present embodiment. FIGS. 11A and 11B are graphs showing a change of the input impedance of the loop antenna 111 in accordance with the frequency when each ratio of the length of the facing section 108 to the circumferential length of the loop antenna 111 is set to 1% and 7%.

The graphs of FIGS. 11A and 11B show a real part 191 and an imaginary part 192 of the input impedance before the connection of the drawn lines 103 and 104, and a real part 193 and an imaginary part 194 of the input impedance after the connection of the drawn lines 103 and 104. When the two drawings are compared, a resonant frequency is changed before the connection by about 2% in the connection of the drawn lines 103 and 104 in FIG. 11A illustrating input impedance characteristic of a loop antenna not adopted in the present embodiment. In contrast, in FIG. 11B illustrating input impedance characteristic of the loop antenna 111 adopted in the present embodiment, it is found that the resonant frequency is rarely distorted before and after the connection of the drawn lines 103 and 104. This means that an influence of disturbance is inhibited due to strong coupling in the facing section 108. That is, the loop antenna 111 according to the present embodiment can be preferably applied to pixel array arrangement, and thus a terahertz wave sensor that has a radiation direction appropriate for an imaging device and has high sensitivity can be realized.

Second Embodiment

Figure 12:
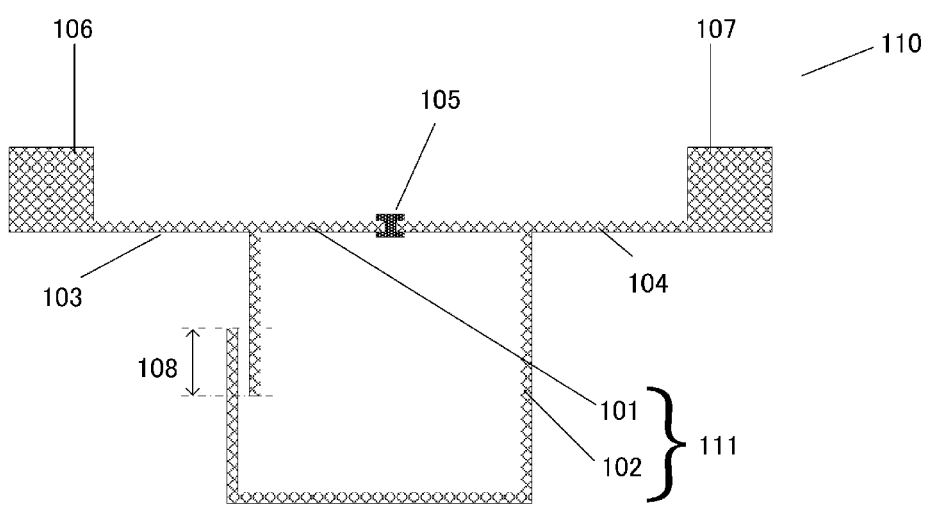
FIG. 12 is a schematic diagram illustrating a configuration of an example of a terahertz wave sensor according to another embodiment.

FIG. 12 is a diagram illustrating an overall configuration of the loop antenna 111 included in a terahertz wave sensor according to a second embodiment. In FIG. 12, a rectangular shape of the loop antenna 111 on the surface of a substrate is exemplified, but the shape of the loop antenna 111 may be polygonal. In the loop antenna 111 of FIG. 12, the facing section 108 is formed by extending the metal films 101 and 102 not to overlap each other from each bent portion. When the shape of the loop antenna 111 is not circular but polygonal as in the present embodiment, the degree of design freedom of the loop antenna 111 is improved. For example, when the terahertz wave sensor is configured to have a two-dimensional array arrangement, the loop antenna 111 can have a shape appropriate for arrangement by bending the metal films to match the adopted arrangement.

The shape of the metal films 101 and 102 in the facing section 108 is not limited to the shape illustrated in FIG. 12 and any of the shapes exemplified in FIGS. 4A to 4E can be adopted as in the first embodiment. When the metal films 101 and 102 in the facing section 108 have such a shape, capacitive coupling and inductive coupling of the metal films 101 and 102 in the facing section 108 are formed, and thus it is possible to manufacture the loop antenna 111 capable of obtaining sufficient high-frequency coupling.

As in the first embodiment, in the present embodiment, the resonant frequency of the loop antenna 111 can be determined on the basis of a sum of the lengths of the metal films 101 and 102 included in the loop antenna 111. Specifically, for a wavelength ($\lambda$) of radio waves with a frequency selected as the resonant frequency, a sum of the lengths of polygonal sides of the loop antenna 111 can be set to (n+0.5)×$\lambda$ (where n is 0 or a natural number) such as a 0.5$\lambda$, 1.5$\lambda$, or 2.5$\lambda$. Here, the wavelength used to determine the sum of the lengths of the polygonal sides of the loop antenna 111 is calculated with a combined value of relative dielectric constants of the substrate 109, the insulating film 110, and the atmospheric air surrounding the loop antenna 111.

In the present embodiment, when the shape of the loop antenna 111 is polygonal, the degree of design freedom of the loop antenna 111 is improved. For example, the shape of the loop antenna 111 can be appropriate for the pixel array arrangement. The reception sensitivity is changed depending on an aperture area of the loop antenna 111. Therefore, when the shape of the loop antenna 111 is considerably slim or folded, there is a possibility of the aperture area decreasing and the reception sensitivity deteriorating. Accordingly, the loop antenna according to the present embodiment can be preferably applied to the pixel array arrangement, and thus a terahertz wave sensor that has a radiation direction appropriate for an imaging device and has high sensitivity can be realized.

First Example

Hereinafter, an example of the foregoing embodiment will be described. In the example, an image forming device in which the foregoing loop antenna is used will be assumed. In the image forming device, the loop antenna 111 is formed on the substrate 109 manufactured using a semiconductor material such as silicon. The thickness of the substrate 109 may be a thickness adopted in the technology of the related art. When a reflection plate (not illustrated) is provided on an opposite surface to a side on which the loop antenna 111 of the substrate 109 is provided in order to improve directivity, the thickness of the substrate 109 is preferably set to a thickness of about 0.5 times the resonant wavelength. As an example of the present example, in order to receive terahertz waves with a frequency of 1 THz and a wavelength of 300 μm, the thickness of the substrate 109 is preferably set to a thickness of about 13 μm based on a relative dielectric constant (11.9) of silicon. For a dielectric constant of silicon near a frequency of 1 THz, it is necessary for s characteristic of an actually manufactured loop antenna to match a designed value.

Here, the substrate 109 and the metal films 101 and 102 included in the loop antenna 111 are manufactured by forming $SiO_2$ with a thickness of 1.5 μm on the substrate 109 by a chemical vapor deposition (CVD) method and electrically isolating the formed $SiO_2$. The metal films 101 and 102 are formed of metal thin films such as aluminum with conductivity. Because conductivity of a metal thin film has a relation with impedance of an antenna, adjustment in impedance matching with the rectifying element 105, as will be described below, can be performed in accordance with conductivity of the metal thin film. In this example, aluminum with a thickness of 200 nm is formed by a sputtering method and the metal films 101 and 102 are formed by etching using a photoresist.

In this example, a Schottky barrier diode is adopted as the rectifying element 105 to detect a frequency of a terahertz wave. As illustrated in FIG. 2, to manufacture a Schottky barrier diode on the substrate 109 formed of silicon, an impurity density of the surface of the substrate 109 formed of silicon is set to about $1 \times 10^{18}$ [pieces/cm$^3$] or less. As a method of controlling an impurity density of the surface of the substrate 109, there is a method of directly causing a crystalline silicon thin film with a desired impurity density to directly grow in epitaxial growth or a method of directly implanting impurity atoms into silicon in accordance with a scheme such as ion implantation. In this example, a substrate formed by causing n-type silicon with an impurity density of $2 \times 10^{16}$ [pieces/cm$^3$] to grow by about 200 nm on a silicon substrate with the (100) plane by epitaxial growth is used as the substrate 109. Because a characteristic of a Schottky barrier diode is determined by work functions of silicon and metal, the characteristic of the Schottky barrier diode is considerably changed depending on types of metal materials used as the electrodes 123 and 124. In this example, cobalt with a thickness of 50 nm is used for the electrodes 123 and 124. Thus, the electrode 124 serves as a Schottky electrode. To cause the electrode 123 pared with the electrode 124 to serve as an ohmic electrode, a density of phosphorous which is impurities is adjusted to $2 \times 10^{20}$ [pieces/cm$^3$] in the contact region 125 by an ion implantation scheme. When a pn junction diode is used as the rectifying element 105, a p type of contact region 125 may be set using impurities of boron.

The through electrodes 121 and 122 are manufactured by forming contact holes in the insulating film 110 insulating the metal films 101 and 102 from the substrate 109 by a dry etching method and embedding tungsten in the contact holes by a CVD method. The loop antenna 111 is formed by connecting the metal films 101 and 102 to the rectifying element 105 via the through electrodes 121 and 122.

In the circular loop antenna 111 according to this example, the resonant frequency of the loop antenna 111 can determined in accordance with the circumferential length of the loop antenna 111. The wavelength of radio waves used to determine the circumferential length of the loop antenna 111, that is, a resonator length, is calculated by a combined value of relative dielectric constants of the substrate 109, the insulating film 110, and the atmospheric air surrounding the loop antenna 111. In this example, the diameter of the loop antenna 111 is set to 70 μm so that the resonant frequency of the loop antenna 111 is 1 THz and the resonator length is 1.5 times the resonant wavelength.

In the loop antenna 111, the facing section 108 is provided for current driving of the rectifying element 105. The facing section 108 is configured such that a current or a voltage supplied from the drawn lines 103 and 104 is applied to the rectifying element 105. The facing section 108 becomes AC coupling by the capacitive coupling and the inductive coupling at the frequency (1 THz) of radio waves to be received, and thus the loop antenna 111 functions. In this example, to set the ratio of the length of the facing section 108 to the circumferential length of the loop antenna 111 to 5%, the length of the facing section 108 is set to 11 μm. The drawn lines 103 and 104 are formed of the same material as that of the loop antenna 111.

A reflection plate (not illustrated) formed of a metal thin film is provided on the rear surface of the substrate 109 via an insulating film so that the reflection plate does not come into electrical contact with the substrate 109. In this example, the reflection plate is manufactured by forming SiN with a thickness of 200 nm as an insulating film and forming aluminum of 200 nm on the insulating film.

A driving voltage or current generated by the circuit substrate 134 can be applied to both ends of the rectifying element 105 via the two through electrodes 132, the metal pads 106 and 107, and the drawn lines 103 and 104. To manufacture the through electrodes 132, the substrate 109 and the circuit substrate 134 are first adhered to each other by the adhesive 131, and then the substrate 109 is holed at portions in which the through electrodes 132 are formed until reach the electrodes 135 by a driving etching method or the like. Further, after the insulating films 133 of $SiO_2$ of 1 μm are formed so that the through electrodes 132 are not electrically conducted with the substrate 109, metal films are formed on the insulating films 133 by a sputtering method or a plating method. Then, the through electrodes 132 are inserted into the holes formed by the holing. It is desirable to select a metal with large conductivity as the material of the through electrodes 132. In this example, the through electrodes 132 are formed by causing copper to grow by plating.

In this example, to set 5% as the ratio of the length of the facing section 108 to the circumferential length of the loop antenna 111, the length of the facing section 108 is set to 11 μm. As described in the foregoing embodiment, the loop antenna in this example can be preferably applied to pixel array arrangement, and thus a terahertz wave sensor that has a radiation direction appropriate for an imaging device and has high sensitivity can be realized.

According to the technology of the present disclosure, it is possible to provide an element that has a radiation direction appropriate for a loop antenna using a terahertz wave, has high sensitivity, and has small noise.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-151259, filed on Aug. 21, 2019, which is hereby incorporated by reference herein in its entirety.

What is claimed is:

1. An element comprising:
    a loop antenna configured to include first and second metal lines on a surface of a substrate on or from which terahertz waves are received or emitted; and
    a rectifying element or an oscillation element electrically connected to the first and second metal lines,
    wherein the element has a facing section at which a first surface of a first end not connected to the rectifying element or the oscillation element at an end of the first metal line faces a second surface of a second end not connected to the rectifying element or the oscillation element at an end of the second metal line,
    wherein a direction in which the first surface faces the second surface is a direction in which the first end extends and is a direction intersecting a direction in which the second end extends,
    wherein the first end has a third surface opposite to a side on which the first surface faces the second surface,
    wherein the second end has a fourth surface opposite to a side on which the second surface faces the first surface, and
    wherein a distance between the third and fourth surfaces in the direction in which the first surface faces the second surface is greater than a sum value of a thickness of the first metal line and a thickness of the second metal line.

2. The element according to claim 1, wherein a length of the first end in the facing section is 1.4% to 7% of a length of the loop antenna in a direction parallel to the surface of the substrate.

3. The element according to claim 1, wherein a length of the first end in the facing section is 1.4% to 5.5% of a length of the loop antenna in a direction parallel to the surface of the substrate.

4. The element according to claim 1, wherein the facing section includes a position at which a current applied to the loop antenna is minimum.

5. The element according to claim 1, wherein a first drawn line formed of a metal is connected to the first metal line, a second drawn line formed of a metal is connected to the second metal line, and the first and second drawn lines are connected to an external circuit of the element.

6. The element according to claim 5, wherein the first and second drawn lines are respectively connected to the first and second metal lines at positions at which voltages applied to the loop antenna are minimum.

7. The element according to claim 1, wherein an insulating film is disposed between the loop antenna and the substrate.

8. The element according to claim 1, wherein a thickness of the first metal line in the facing section is within a range determined by an average value of a thickness in an entire length of the first metal line and a standard deviation of the thickness in the entire length of the first metal line.

9. The element according to claim 1, wherein a resonator length of the loop antenna is a length that is 1.5 times a resonant wavelength.

10. The element according to claim 1, wherein a frequency of the terahertz waves is at least 0.03 THz and not more than 30 THz.

11. The element according to claim 1, wherein at least one of the first and second metal lines has a bent portion to form the facing section.

12. The element according to claim 1, wherein the first and second metal lines are formed not to overlap each other without being bent.

13. The element according to claim 1, wherein the first and second ends have meandering portions parallel to each other.

14. The element according to claim 1, wherein, on the surface of the substrate, a shape of the loop antenna formed by the first and second metal lines is circular.

15. The element according to claim 1, wherein, on the surface of the substrate, a shape of the loop antenna formed by the first and second metal lines is polygonal.

16. The element according to claim 15, wherein the first and second metal lines extend not to overlap each other from each bent portion to form the facing section.

17. An image forming device comprising:
- an element including a loop antenna that includes first and second metal lines on a surface of a substrate on or from which terahertz waves are received or emitted, and a rectifying element electrically connected to the first and second metal lines; and
- a facing section provided in the element at which a first surface of a first end not connected to the rectifying element at an end of the first metal line faces a second surface of a second end not connected to the rectifying element at an end of the second metal line,
- wherein a direction in which the first surface faces the second surface is a direction in which the first end extends and is a direction intersecting a direction in which the second end extends,
- wherein the first end has a third surface opposite to a side on which the first surface faces the second surface,
- wherein the second end has a fourth surface opposite to a side on which the second surface faces the first surface, and
- wherein a distance between the third and fourth surfaces in the direction in which the first surface faces the second surface is greater than a sum value of a thickness of the first metal line and a thickness of the second metal line.

* * * * *